United States Patent Office 3,804,918
Patented Apr. 16, 1974

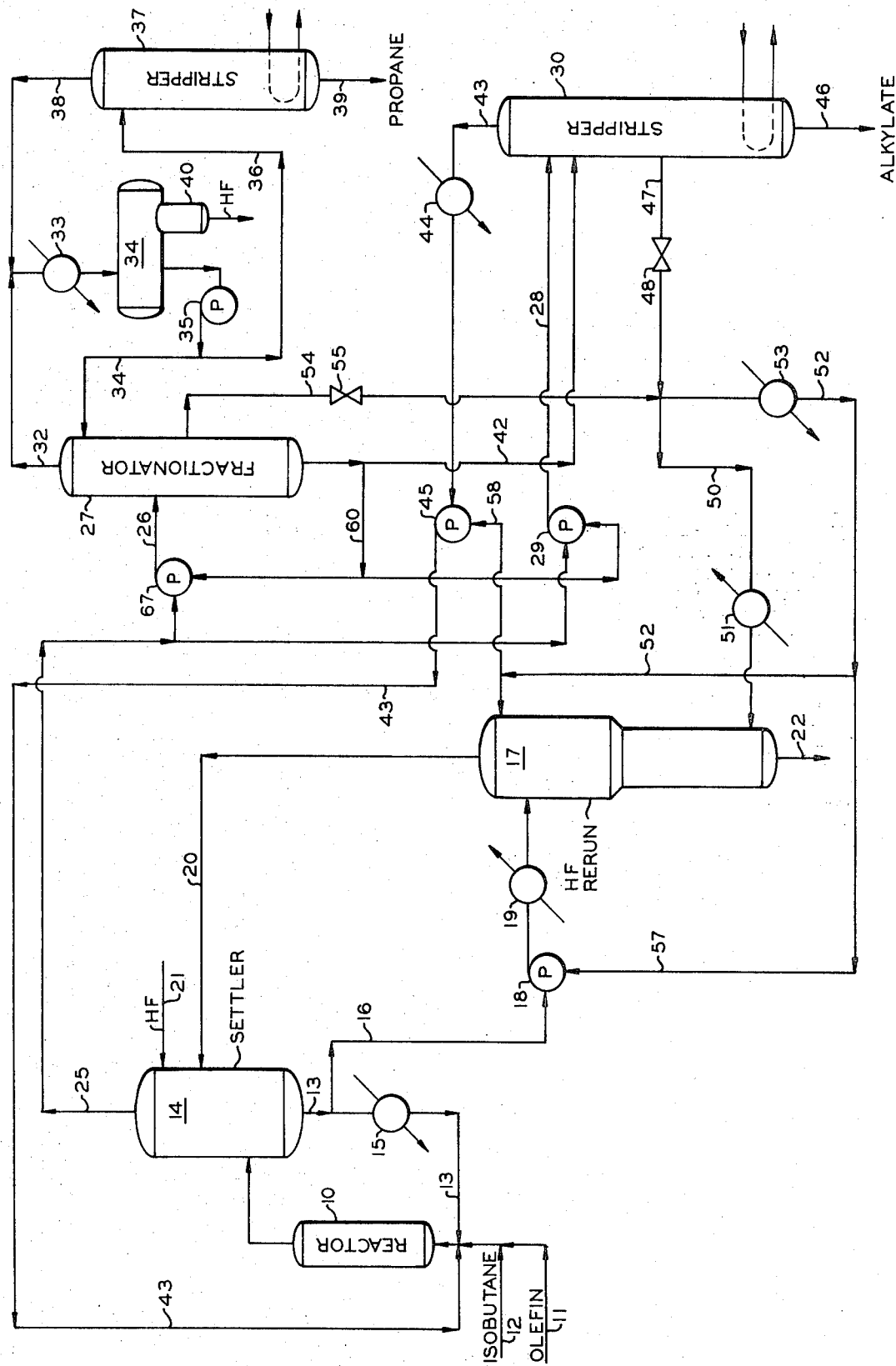

3,804,918
LIQUID FLUSHING FOR THE PUMP SEAL
IN ALKYLATION
Miles L. Henderson, Bartlesville, Okla., assignor to
Phillips Petroleum Company, Bartlesville, Okla.
Filed June 2, 1972, Ser. No. 258,992
Int. Cl. B01j 9/14; C07c 3/54
U.S. Cl. 260—683.58                                     5 Claims

ABSTRACT OF THE DISCLOSURE

An HF alkylation process is carried out in a system which includes a reactor, a settler, an acid purification unit, and a product separation unit. Streams containing acid are pumped by pumps which are provided with liquid flush seals. Flush liquid for the pumps is obtained from a zone of the separation unit which is substantially alkylate-free. This prevents formation of acid soluble oils downstream of the pumps.

---

It is common practice in the petroleum industry to produce high octane motor fuel by alkylating olefins with isoparaffins in the presence of hydrogen fluoride (HF) catalyst. The effluent from the alklation reactor is usually passed to a settling vessel wherein a hydrocarbon phase is separated from an acid phase. The hydrocarbon phase is fractionated to separate low boiling hydrocarbons from the alkylate product. This can be accomplished by passing the hydrocarbon phase to a depropanizer, for example, with the kettle product from the depropanizer being passed to a stripping zone to remove isoparaffins. The acid phase is recycled to the reactor. In order to prevent build-up of acid soluble oil in the system, a portion of the acid phase is directed to an HF re-run unit before being returned to the reactor.

In a system of this type it is common practice to employ pumps with liquid flush seals to pump the various process streams. It is important that a non-corrosive liquid be employed to flush the pump seal. For economic reasons, it is desirable to employ a liquid available in the process. One source of flushing liquid employed heretofore has been the kettle product from the depropanizer. However, it has been discovered that the use of such a liquid results in the production of additional acid soluble oil when this liquid contacts the acid phase being pumped from the settler to the HF re-run unit. This production of acid soluble oil apparently results from the reaction of HF on alklate present in the kettle product from the depropanizer. Any excess acid soluble oil so produced poses a disposal problem and destroys valuable product of the process.

In accordance with this invention, pump flush liquid for use in an HF process of the type described is obtained by withdrawing a side stream from either the depropanizer or the stripper in the separation system. This side stream is withdrawn in the vapor phase so as to be substantially free of alkylate product. Such a vapor stream is also substantially free of HF so as to minimize corrosion problems in the pumps.

The accompanying drawing is a schematic representation of an HF alkylation process utilizing this invention.

Referring now to the drawing in detail, there is shown an alkylation reactor 10 which can be in the form of a vertical conduit. An olefin feed stream is introduced through a conduit 11 and an isoparaffin feed stream is introduced through a conduit 12. The olefin feed generally comprises one or more olefins having from 2 to 5 carbon atoms, while the isoparaffin stream generally comprises isobutane and/or isopentane. In a typical operation, the olefin feed comprises a mixture of propylene and butylenes, while the isoparaffin feed comprises primarily isobutane. A catalyst comprising hydrogen fluoride is introduced into reactor 10 through a conduit 13. In a typical operation, the HF is in the liquid phase and has a purity of about 90 percent. The effluent from reactor 10 is passed to a settler 14 in which a phase separation is made between the acid and hydrocarbons. The acid is recycled through conduit 13 which has a cooler 15 therein.

A portion of the acid removed from settler 14 is passed through a conduit 16 to an HF re-run unit 17. A pump 18 and a heater 19 are disposed in conduit 16. A purified acid-containing stream and isobutane are removed from the top of unit 17 and returned to settler 14 through a conduct 20. Fresh make-up acid, as required, is added to the system through a conduit 21. Acid soluble oil is removed from the bottom of the re-run unit 17 through a conduit 22.

The hydrocarbon phase in settler 14 is removed through a conduit 25. A portion of this hydrocarbon is passed through a conduit 26, which has a pump 27' therein, to a fractionator 27. The remainder of the hydrocarbon is passed through a conduit 28, which has a pump 29 therein, to a stripper 30. Fractionator 27 is employed to remove propane and HF from the alkylate product. An overhead stream from the fractionator is directed through a conduit 32 and a condenser 33 to an accumulator 34. Condensed liquid hydrocarbon is passed by a pump 35 and a conduit 34 to fractionator 27 as reflux. Additional liquid hydrocarbon is directed through a conduit 36 to a stripper 37. Vapor removed from the top of stripper 37 is directed through a conduit 38 to condenser 33. A propane product is removed from the bottom of stripper 37 through a conduit 39. Accumulator 34 is provided with an acid withdrawal leg 40 through which any HF present in the system is removed.

The kettle product from fractionator 27 is passed through a conduit 42 to stripper 30. Overhead vapor from the stripper is recycled to reactor 10 through a conduit 43 which has a condenser 44 and a pump 45 therein. A liquid alkylate product is removed from the bottom of stripper 30 through a conduit 46.

A vapor stream is withdrawn from the side of stripper 30 through a conduit 47 which has a valve 48 therein. A first portion of this stream is directed through a conduit 50, which has a heater 51 therein, to the lower region of re-run unit 17. This provides stripping vapor to remove HF from the acid soluble oil. A second portion of the stream withdrawn through conduit 47 is passed through a conduit 52, which has a condenser 53 therein, to the upper region of re-run unit 17. The resulting condensate is sprayed into the top of unit 17 to prevent acid soluble oil from being entrained in the overhead vapor stream. As an alternative, or in addition to the vapor stream removed through conduit 47, a vapor stream can be withdrawn from the side of fractionator 27 through a conduit 54 which has a valve 55 therein. Conduit 54 communicates with conduit 47.

Pump 18 is provided with a liquid flush mechanical seal. Typical pump seals which can be employed for this purpose are described in Bulletin No. 69–1880 of Borg-Warner Corporation, Box 2017, Terminal Annex, Los Angeles, Calif. 90054. In accordance with this invention, a liquid flush stream is supplied to pump 18 through a conduit 57 which communicates with conduit 52 downstream of condenser 53. The resulting liquid stream delivered to pump 18 is substantially free of hydrogen fluoride and of alkylate product. This minimizes corrosion in the seal of pump 18 and prevents the formation of additional acid soluble oil in the re-run unit. Such acid soluble oil would be produced if a stream containing alkylate were employed as the flush liquid. This same liquid is supplied to the seal of pump 45 through a conduit 58 which communicates with conduit 52 downstream of condenser 53. Flush liquid for pumps 67 and 29 is supplied by a conduit 60 which communicates with conduit 42. It is not essential that this flush liquid be alkylate-free because substantially no hydrogen fluoride is present downstream of pumps 67 and 29.

While the invention has been described in conjunction with a presently preferred embodiment, it obviously is not limited thereto.

What is claimed is:

1. In an alkylation process wherein isoparaffins and olefins are alkylated employing an acid catalyst, in which effluent from the reaction zone is passed to a settling zone, a stream containing the acid catalyst is pumped from the settling zone to an acid purification zone by means of a pump having a liquid flushing seal, a stream containing alkylate is passed from the settling zone to a separation zone wherein alkylate is separated from lighter hydrocarbons; the improvement comprising removing a vaporous stream of isoparaffins from said separation zone, condensing said vaporous stream, and passing the resulting condensate to said pump as flushing liquid for the seal.

2. The process of claim 1 wherein the isoparaffins being alkylated include isobutane and the olefin comprises a mixture of propylene and butylenes, wherein said separation zone comprises a fractionator to remove propane and a stripper to remove lighter hydrocarbons from a kettle product of the fractionator, and wherein said vaporous stream comprises isobutane which is removed from said stripper.

3. The process of claim 2 wherein an overhead product stream from said stripper is pumped to said reaction zone by means of a second pump having a liquid flush seal and wherein a portion of said condensate is passed to said second pump as flushing liquid for the seal.

4. In an alkylation system including a reactor, a settler, a stripper, means to pass effluent from said reactor to said stripper, an acid purification unit, first conduit means extending from a lower region of said settler to said purification unit, said first conduit means having a pump therein which has a liquid flush seal, a separation unit comprising a fractionator and a stripper, second conduit means communicating between an upper region of said stripper and said fractionator, and third conduit means communicating between the lower region of said fractionator and said stripper; the improvement comprising fourth conduit means communicating between an intermediate region of said stripper and said pump to deliver flushing fluid to the pump, said fourth conduit means communicating with said stripper at a region to remove a vaporous stream therefrom, and a condenser in said fourth conduit means.

5. The system of claim 4, further comprising fifth conduit means communicating between the upper region of said stripper and said reactor to recycle unreacted hydrocarbons to said reactor, a second pump having a liquid flush seal in said fifth conduit means, and sixth conduit means communicating between said fourth conduit means downstream of said condenser and said second pump to supply flushing liquid to said second pump.

References Cited

UNITED STATES PATENTS

| | | | |
|---|---|---|---|
| 3,551,515 | 12/1970 | Gentry | 260—683.48 |
| 2,350,448 | 6/1944 | Collins | 260—683.48 |
| 2,400,386 | 5/1946 | Bolinger et al. | 260—683.48 |

DELBERT E. GANTZ, Primary Examiner

G. J. CRASANAKIS, Assistant Examiner

U.S. Cl. X.R.

23—288; 260—683.48; 415—175